United States Patent Office 3,190,177
Patented June 22, 1965

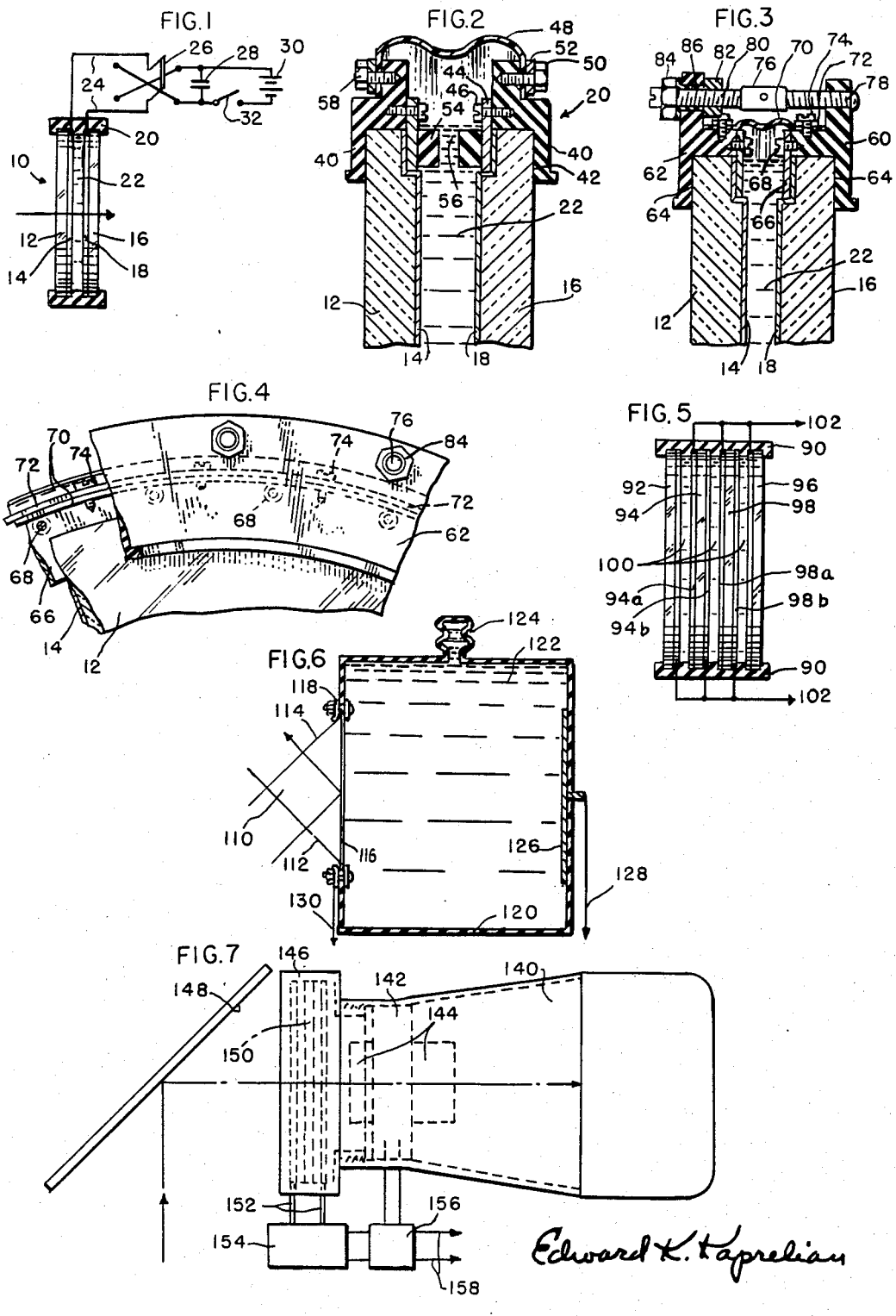

3,190,177
ELECTROCHEMICAL SHUTTERS
Edward K. Kaprelian, Joppa, Md.
(29 Riveredge Road, Red Bank, N.J.)
Filed Apr. 15, 1958, Ser. No. 728,745
5 Claims. (Cl. 88—61)

The present invention relates to shutters and more particularly to electrochemical shutter devices which depend for their operation on the production and destruction of light-absorbing or reflecting surfaces in an electrolyte. While described here with respect to use in aerial cameras, these devices are equally applicable to sound recording, tachistoscopic projection and many of the uses to which light valves or modulators have been put.

It is the object of this invention to provide a light shutter of large absolute aperture, i.e., to 36 inches in diameter and larger.

Another object of this invention is to provide a light shutter of high speed, i.e., $1/10,000$ second.

Still another object is to provide a shutter which is directly responsive to an electrical signal.

Still another object is to provide a shutter with no moving parts.

The invention involves the phenomena ordinarily associated with electroplating, except that very high current densities are employed to dissolve the anode and/or plate out the cathode. The character of the metal plated out may vary from a mirror-like layer to a dull, sludge-like precipitate depending upon the particular metal, the electrolyte, the anode and cathode characteristics and the electrical current density, or rate of refraction. In some instances the obturating action of the shutter may be incomplete, with some small amount of light still being passed by the electrodes. In these cases an auxiliary or capping shutter is employed as an auxiliary device.

It is obvious that the invention may assume a number of forms as follows:

(1) The opaque metallic layer can be deposited on a transparent electrode to obturate light being transmitted through the electrode.

(2) The metallic layer can be deposited as a mirror layer on a light absorbing or transmitting electrode to reflect light into a system.

(3) The metallic layer can be deposited as an opaque light absorber on the surface of a mirror in the optical path.

(4) The metal can appear as a colloidal, light absorbing suspension in the electrolyte itself.

The operation of the invention and its advantages will be fully understood from the following description of the various embodiments when read in connection with the accompanying drawings in which FIG. 1 shows diagrammatically a simple form of the invention;

FIG. 2 shows a single unplate-replate type of transmission shutter element;

FIG. 3 shows in sectional elevation a second type of unplate-replate shutter element;

FIG. 4 is a front view of the shutter of FIG. 3;

FIG. 5 shows diagrammatically a multiple element unplate-replate type of transmission shutter;

FIG. 6 shows in diagrammatic cross section a plate-unplate shutter of the reflection type;

FIG. 7 show a shutter of the type shown in FIGS. 2 and 3 as applied to an aerial camera.

FIG. 1 shows diagrammatically the basic shutter action. The shutter, shown generally at 10, comprises a pair of glass plates 12 and 16 held by a cell or frame 20 of electrically insulating material. Plates 12 and 16 carry on their inner surfaces transparent conducting layers 14 and 18 respectively. These layers may comprise fused tin oxide (NESA glass), evaporated metal, or the like, preferably with very low electrical resistance. The volume between the conducting surfaces is filled with a suitable electrolyte, preferably a plating solution such as is described below.

The conducting layers 14 and 18 are connected through leads 24 to a reversing switch 26 which in turn connects to capacitor 28. This capacitor is charged from battery 30 through a main switch 32. In practice switch 26 is entirely electronic in nature, preferably employing a thyratron tube circuit, the details of which are well known but are not directly pertinent to this invention.

In operation switches 32 and 26 are initially closed and a metallic film is plated out from electrolyte 22 onto conducting layer 14. The shutter is now opaque and no light passes through the glass plates. When switch 26 is thrown into the opposite position the reversed polarity causes the plated metallic film to become unplated from layer 14, permitting light to pass through the shutter. In a small fraction of a second the metal film appears on conducting layer 18, again stopping the passage of light. Depending upon the electrolyte, the particular metal, the thickness of the electrolyte layer, the value of the capacitor and the voltage employed the action can be made very rapid. Spacing between electrodes can vary between 0.010 inch and 3 inches, the preferred spacing being between 0.125 inch and 1.5 inches.

The preferred metals for deposition are silver, thallium, tin and mercury, although gold, tellurium, copper and aluminum are not unfavorable with regard to the amount of opaque deposit which can be formed per ampere-second of current flow through the electrolyte. With silver, for example, a deposit of 100 micrograms per sq. cm. (approximately 0.09 gram per sq. ft.) yields an optical density greater than 2. Silver is deposited at the rate of 100 micrograms per ampere-second, and deposition of a .1 gram/sq. ft. layer of silver on a 14 inch diameter (approximately 1 sq. ft.) window requires an average of $10^6$ amperes acting for one-ten thousandth of a second.

Conventional electroplating baths, such as the usual cyanide bath for silver, and the usual copper sulfate-sulfuric acid bath for silver, may be employed, although substantial modifications are advisable in order to offset the undesirable effects of the exceptionally high current densities employed in the shutter.

FIG. 2 shows one of the preferred constructions for the shutter 20 itself. Windows 12 and 16 are held in a pair of annular, flanged frame members 40 in a substantially symmetrical arrangement as shown. The windows are preferably sealed to members 40 at surface 42 through the employment of such techniques as soldering or the use of thermosetting adhesives. An annular contact element 44 is held tightly against the conducting layer by means of screws 46. A flexible sealing strip 48 preferably made of an inert organic sheet material, such as one of the fluorinated hydrocarbons, is attached to both members 40 by means of screws 50 and 58 and annular metallic gasket rings 52. The electrical connections from surface 18 are made through one or more screws 50 and from surface 14 through one or more screws 58. A ceramic or hard rubber insulating member 54 separates the two halves of the shutter and is provided with openings 56 to allow displacement of electrolyte 22 during operation and at such other times as the volume of electrolyte changes. A ring clamp, or equivalent, not shown, is employed to urge the two frame members 40 toward each other and against separator 54.

In the modifications of FIGS. 3 and 4 the windows used in the arrangement of FIG. 2 are held and sealed in a different manner. Here window 16 is sealed at 64 to a frame member 60 which latter also carries a contact ring 66 held in good electrical connection with conducting surface 18 by means of screws 68. One side of a flexible inert diaphragm strip 70 is held in sealed relationship to frame member 60 by means of ring washer 72 and screws 74. At intervals around its periphery member 60 receives the threaded ends 78 of screws 76 which latter preferably have one end threaded with right hand threads and the other end with left hand threads.

Ring member 62 is similarly provided with electrical contact means and diaphragm sealing means for retaining electrolyte 22. The connection of screw 76 to member 62 is different, however, because of the need for electrical isolation of members 60 and 62. Ends 80 of screws 76 are threaded into electrically insulating sleeves 86 around the periphery of member 62. Lock nuts 82 and 84 maintain the correct spacing between the windows, once this relationship has been set by adjustment of screws 76. Flanges on insulating sleeve 86 prevent nuts 82 and 84 from making contact with member 62.

The advantages of the modification of FIG. 3 include the capability of allowing change of spacing between the windows, and the ability to make such changes after assembly and test of the shutter without destroying the shutter seal.

FIG. 5 shows diagrammatically an unplate-replate transmission shutter of the series or multiple type. Here a pair of outer windows 92 and 96 cooperate with two inner windows to produce three plated opaquing surfaces. Conducting layer 94a of window 94, conducting layer 98a of window 98 and the conducting layer of window 96 are connected together electrically to form one electrode set of the shutter. Conducting layers 98b of window 98, conducting layer 94b of window 94 and the conducting layer of window 92 are connected together to form the other electrode set of the shutter. Conductors 102 connect the shutter elements through the thyratron switch to the capacitor. The cylindrical frame elements for sealing the shutter, shown schematically at 90, prevent leakage of electrolyte 100.

In operation the polarity of conductor 102 is charged by the switch and the metal unplates from 92, 94b and 98b and plates onto 96, 98a and 94a, or vice versa. Increased efficiency results from the use of a plurality of light blocking layers, and this action is enhanced by the ability to change the deposited layer thickness within each cell, thereby more effectively stopping light over a wide range of the spectrum. It is of course possible to connect multiple shutters in series rather than parallel electrical connection should such arrangement be preferred for more favorable electrical impedance conditions.

FIG. 6 shows diagrammatically a plate-unplate shutter of the reflection type. Here a right angle prism 110 is mounted on a tank 120, the latter preferably constructed of an insulating material. The two right angle faces 112 and 114 of the prism act respectively as entrance and exit windows of the shutter. The hypotenuse of the shutter is sealed to one side of tank 120 by means of suitable gasketing and fastening means 118 or similar arrangement. The fastening means includes electrical connection between conducting layer 116 on the hypotenuse of the prism and a lead wire 130. Layer 116 is immersed in plating both on electrolyte 122 with which the tank is filled. An expansion chamber accommodates changes in electrolyte volume during operation. An electrode 126 within the tank is connected to lead 128, which, together with lead 130, connect to the switch means, not shown.

Normally surface 116 is free of any opaque or reflecting metallic deposit, and light entering face 112 of the prism enters electrolyte 122 with substantially no reflection at the interface between the prism glass and the conducting layer 116 or at the interface between the conducting layer 116 and electrolyte 122. This can be achieved by either providing more or less exact match of index of refraction between the glass, the layer and the electrolyte, or by a combination of approximate matching of indices together with multiple-layer low reflection coatings.

The light entering the electrolyte is absorbed by the reflection from the dark walls of the tank. The geometry of the tank shape can be made favorable for reflection paths that do not return light in the direction of the axis of the exit window. The absorbing action can be enhanced by the addition of appropriate dyes or pigments to the electrolyte. Transmission through the open prism can by these means be reduced to less than 0.1%. During exposure, the application of current across leads 128 and 130 will cause a reflecting surface to plate out on layer 116 resulting in transmission of light through the prism and reversal of the current will cause unplating of this layer, resulting in termination of light transmission. Obviously a flat glass electrode could be used in place of the prism, provided the reflection from the outer face is reduced to 0.1% or 0.01% of the incident light.

FIG. 7 shows application of a shutter of the type shown in FIGS. 3 and 4 to a high speed aerial camera. The camera shown at 140, is provided with the usual shutter 142 of the between-lens type and the usual photographic objective 144. Mounted at the front end of the lens cone is the electrochemical shutter casing 146 containing a shutter 150 of the type shown in FIGS. 3 and 4, although a multiple cell shutter of the type shown in FIG. 5 could also be employed. Because electrochemical shutters operate best when the transparent electrodes are in a vertical or nearly vertical plane a mirror 148 is employed to change the direction of the optical axis.

The leads 152 connect the electrodes of the shutter to the power circuit box 154 which contains the capacitor and switch and is connected to the power source, not shown, and a control box 156. Leads 158 connect to the tripping switch for operating the camera. When the tripping switch is closed control box 156 causes shutter 142 to open. When shutter 142 is completely open, the thyratron switch in power circuit box 154 is operated, and shutter 150 opens and closes. Shutter 142 then closes and the cycle is complete. If shutter 142 operates at $\frac{1}{100}$ second and shutter 150 at $\frac{1}{10,000}$ second, no objectionable blurring of the picture will occur provided that shutter 150 in the closed condition transmits no more than 0.01%, i.e., possesses an optical density of 4.

It is also possible to obtain a shutter action without the actual deposition of metal on the transparent electrodes. With some plating baths, i.e., copper and silver, a dense cloud of what is apparently reduced or partially reduced metal forms close to the electrode without being attached to the electrode. Reversal of current flow causes this metalloid cloud to become redissolved.

While only these specific embodiments have been shown and described still other modifications will be obvious to those skilled in the art.

I claim:

1. A light shutter comprising a first transparent electrode, a second transparent electrode parallel to, coextensive with, and spaced apart from said first electrode, an insulating frame receiving the edges of said electrodes and retaining same to form therebetween a sealed electrolyte retaining cell, an electrolytic plating bath in said cell, a plated, non-light-transmitting metal layer on the surface of said first transparent electrode, and a source of electrical power connectable to said electrodes for successively unplating said metal layer from said first electrode and plating a non-light-transmitting metal layer on said second electrode in a single continuous action, said source including switching means for reversing the polarity of the power connected to said electrodes.

2. A light shutter as claimed in claim 1, the spacing between said electrodes being adjustable within the range of from 0.125 inch to 1.5 inches.

3. A shutter as claimed in claim 1, said electrical power source comprising a charged electrical capacitor.

4. A light shutter for controlling the transmission of light comprising a sealed electrolytic cell containing a transparent electroplating bath, a transparent light-entrance window forming one wall of the cell and carrying on its inner surface a transparent electrically conducting layer, a transparent light-exit window forming a second wall of said cell, opposite and parallel to said light entrance window and spaced therefrom, said exit window carrying on its surface a transparent electrically conducting layer, the said conducting layers being in physical and electrical contact with the electroplating bath, an electrical circuit including an electrical power source connected to said conducting layers for supplying current thereto such that an opaque metallic layer is plated out on one of said conducting layers, and means for selecting the conducting layer upon which the opaque layer is plated, said selecting means including switching means for instantaneously reversing the polarity of the current applied to said conducting layers, said reversal of polarity unplating the metallic layer on the first conducting layer and replating the metal as a layer on the second conducting layer.

5. A shutter as claimed in claim 4, the spacing between said windows being from 0.125 inch to 1.5 inches.

References Cited by the Examiner

UNITED STATES PATENTS

| | | | |
|---|---|---|---|
| 1,525,554 | 2/25 | Jenks | 88—61 |
| 1,963,417 | 6/34 | Petit | 95—11 |
| 1,963,496 | 6/34 | Land | 88—61 |
| 2,000,380 | 5/35 | Deisch | 88—61 |
| 2,153,490 | 4/39 | Wikkenhauser | 88—61 |
| 2,155,659 | 4/39 | Jeffree | 88—61 |
| 2,467,325 | 4/49 | Mason | 88—61 |
| 2,474,712 | 6/49 | Aparacio | 88—61 |
| 2,575,712 | 11/51 | Jernstedt | 204—228 |
| 2,792,752 | 5/57 | Moncrieff-Yeats et al. | 88—61 |

FOREIGN PATENTS

| | | |
|---|---|---|
| 674,294 | 4/39 | Germany. |
| 241,636 | 10/25 | Great Britain. |

JEWELL H. PEDERSEN, *Primary Examiner.*

DELBERT G. LOWE, EMIL G. ANDERSON,
*Examiners.*